(No Model.)
V. H. BUSCHMAN.
HOSE REEL.
No. 351,688. Patented Oct. 26, 1886.
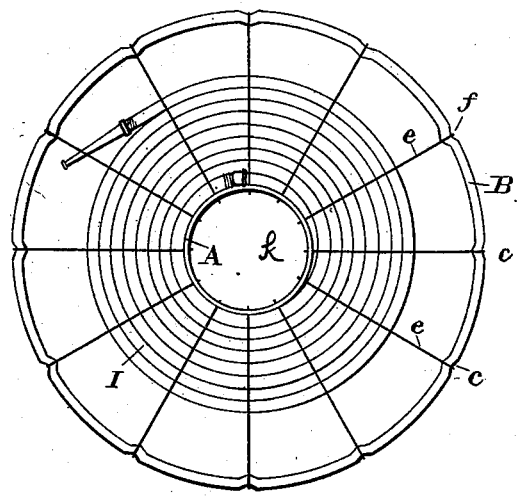
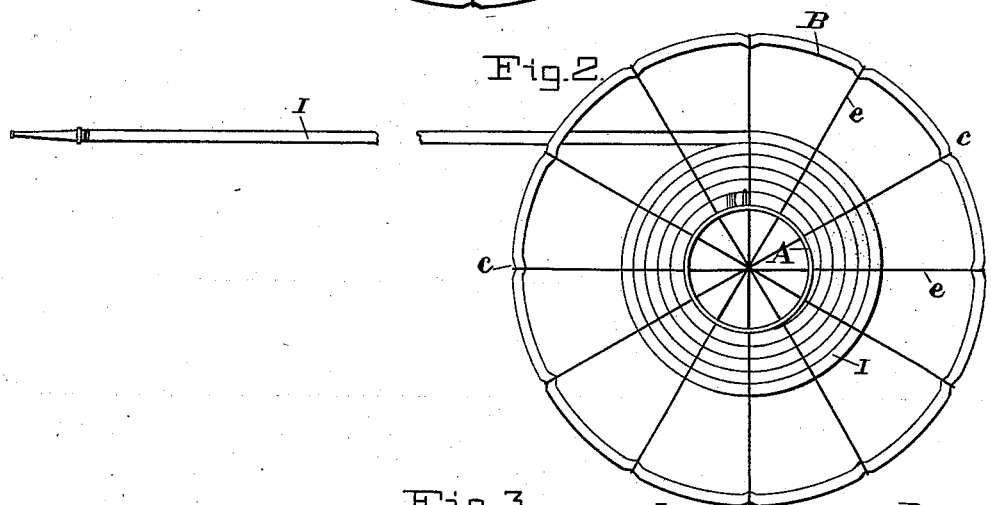
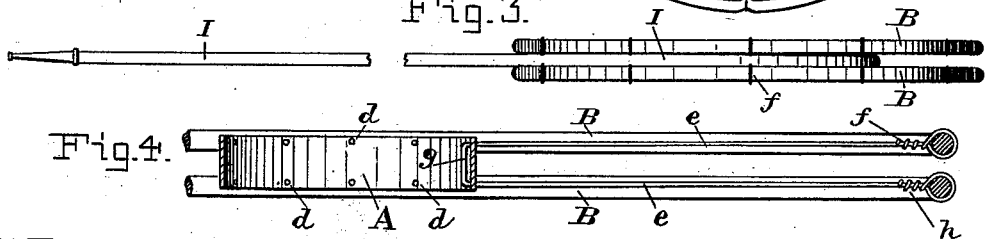
Witnesses:
A. C. Eader
John E. Morris
Inventor:
V. H. Buschman
By Chas B. Mann
Attorney

UNITED STATES PATENT OFFICE.

VICTOR H. BUSCHMAN, OF BALTIMORE, MARYLAND.

HOSE-REEL.

SPECIFICATION forming part of Letters Patent No. 351,688, dated October 26, 1886.

Application filed February 23, 1886. Serial No. 192,761. (No model.)

*To all whom it may concern:*

Be it known that I, VICTOR H. BUSCHMAN, a citizen of the United States, residing at Baltimore, in the State of Maryland, have invented certain new and useful Improvements in Hose-Reels, of which the following is a specification.

My invention relates to a hose-reel, and has for its object to provide a light, simple, and cheap reel for such hose as are used for watering gardens, yards, and streets.

The invention is illustrated in the accompanying drawings, in which Figure 1 is a side view showing the reel with hose on it. Fig. 2 is a side view showing the reel and the hose only partly wound on the reel, and illustrating a modification in the attachment of the spring-spokes. Fig. 3 is a top view of the reel and showing the hose partly wound thereon, as in Fig. 2. Fig. 4 is a sectional view of part of the reel, showing how the spring-spokes are attached to the winding-drum.

The reel consists of two spring-wheels having a common hub or winding-drum, A. It is not mounted on any support, but is designed to be trundled along like rolling a toy hoop, or, as it is for light hose, a person may readily carry it. Two hoops, B, of wood or metal—preferably the latter—have notches $c$ on their rims at equal distances apart. The winding hub or drum A is a ring-shaped band of metal and has two rows of holes, $d$, one row being close to each edge, and a hole in one row together with one in the other row forms a pair. The space between the two rows of holes is just sufficient in width to receive one coil of hose. Suitable spring-rods, $e$, preferably stiff wires, comprise the spokes which connect the hoops and winding-drum. One end of each wire is fastened, as at $f$, about a hoop at a notch, $c$, and from thence extends to a hole, $d$, in one row of the drum, and passes through said hole to the interior of the drum-band, and on the inner side passes crosswise, as at $g$, of the drum-band to a hole, $d$, in the next row, through which it passes to the outer side, and thence extends to the next hoop, where the end is fastened, as at $h$. Each wire thus makes two spokes—one in each wheel—and the space between the two spokes is sufficient only to receive one coil of hose. The spokes $e$, being springy, allow the hoops B to move or yield to or from each other, whereby at any one point the two hoops can be slightly spread apart. This is possible by the yielding character of the spokes. When the hoops are thus spread apart at one point, the effect is to press them slightly closer together at a point on the diametrical opposite side.

The construction and arrangement of this reel contemplate that the hose I shall be wound in a volute coil—that is, each succeeding coil wound upon the reel shall lie upon the previous coil. In the normal position of the hoops they nearly touch each other, or, in other words, the space between them should be a little less than the width of the hose, as thereby when the hose I is coiled between the two laterally-yielding wheels it will be confined or retained in its position by the two hoops so closely approaching each other as to nearly touch.

The winding-drum here shown comprises a circular opening, $k$, through which a person's arm may be passed when carrying the reel.

So far as concerns the feature of the winding-drum provided with two laterally-yielding wheels, having between them a space in breadth sufficient only for one coil of hose, it will be understood the construction to produce this feature may vary from that here shown. For instance, the winding-drum need not be a ring-shaped band of metal nor have a circular opening. The spring-spokes may be attached to the drum differently, and other details may vary from what is here shown.

The spring-spokes, instead of connecting the two hoops and the drum, as shown in Fig. 4, may extend across the center, as shown in Fig. 2, and thus the two ends of the same spoke be attached to one hoop.

Having described my invention, I claim and desire to secure by Letters Patent of the United States—

1. A hose-reel comprising a winding-drum, A, two hoops, B, having such relative position as to nearly touch each other, and spring-wires $e$, connecting the winding-drum and said hoops, whereby the hoops may move or yield to and from each other, and the hose, wound on the drum in a volute coil of single breadth, will be confined or retained by the two hoops approaching each other, as set forth.

2. A hose-reel having a ring-shaped band, A, provided with a row of holes, $d$, close to each edge, two hoops, and spring-wires $e$, passed through the holes in the said band and connected with the hoops, as set forth.

In testimony whereof I affix my signature in the presence of two witnesses.

VICTOR H. BUSCHMAN.

Witnesses:
JOHN E. MORRIS,
JNO. T. MADDOX.